Patented Mar. 9, 1954

2,671,786

UNITED STATES PATENT OFFICE 2,671,786

TRIAZINE ANTHRIMIDE CARBAZOLE VAT DYES

Mario Scalera, Somerville, and Asa Willard Joyce, Plainfield, N. J., assignors to American Cyanamid Company, New York, N. Y., a corporation of Maine No Drawing. Application June 27, 1952, Serial No. 296,094

10 Claims. (Cl. 260—249)

This invention relates to new vat dyestuffs of the anthraquinone series which correspond to the formula:

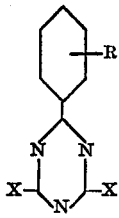

in which R is selected from the group consisting of hydrogen, lower alkyl and lower alkoxy radicals, and X is an α-amino-α'-benzoylamino-α,α'-dianthrimide carbazole; the dianthrimide carbazole being bonded through the α-amino nitrogen bond to the triazine ring.

These products are valuable dyestuffs, giving strong attractive dyeings of excellent fastness properties. They can be made by condensing 2 - phenyl - 4,6 - dihalo - 1,3,5 - triazines with a 1-amino-α-haloanthraquinone. The resulting intermediate is then condensed, under the conditions of the Ullmann reaction, with a 1-amino-α-benzoylaminoanthraquinone, to the bis-anthrimide. The benzoyl radical in the 1-amino-α-benzoylaminoanthraquinone may be substituted, i. e., for example, by chlorine, alkyl or alkoxy groups. The bis-anthrimide may be cyclized to the bis-carbazole by treatment with aluminum chloride. This synthesis gives excellent yields of 1,4-anthrimide dyestuffs. The corresponding 1,3-anthrimide dyestuffs are disclosed and claimed in a copending application Serial No. 296,072 filed June 27, 1952.

It is an advantage of our new series of dyestuffs that they all contain the carbazole ring and have improved substantivity to textile fibers.

The present invention is further illustrated by the following examples. Parts are by weight unless otherwise specified.

Example 1

A mixture of 10.3 parts of 2-(o-methoxyphenyl) 4,6-dichloro-1,3,5-triazine and 20.6 parts of 1-amino-4-chloroanthraquinone in 300 parts of o-dichlorobenzene is heated and stirred at 140° C. until condensation is complete, during which time the orange-tan slurry becomes quite thick. The product is cooled to room temperature, filtered, and washed with o-dichlorobenzene followed by alcohol. The yield is excellent. The reaction product of this example corresponds to the formula:

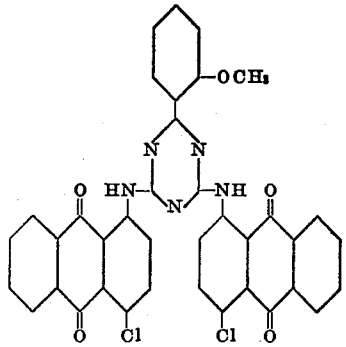

Example 2

A mixture of 13.0 parts of 4-benzoylamino-1-amino-anthraquinone, 13.6 parts of the 2-(o-methoxyphenyl) - 4,6 - di - (4-chloro-1-anthraquinonylamino)-1,3,5-triazine of Example 1, 0.2 part of copper, 0.2 part of iodine, and 12.0 parts of sodium carbonate in 220 parts of nitrobenzene is gradually heated to 200° C. and stirred at this temperature until reaction is complete. The black slurry is then cooled slowly to room temperature and filtered. The resulting intermediate product is washed with nitrobenzene followed by alcohol, slurried in hot dilute hydrochloric acid, filtered and washed. The yield is excellent.

Ring closure of the carbazole nuclei is carried out by suspending 5.0 parts of the above prepared dianthrimide in 25 parts of pyridine, and gradually adding 8 parts of aluminum chloride. Reaction is then completed by heating at 125° C. The reaction mixture is stirred into a solution of sodium hydroxide and filtered. The cake is reslurried at 60° C. in alkaline sodium hydrosulfite, filtered, and the resulting filtrate aerated.

The product is filtered and washed alkali-free. This product has the formula:

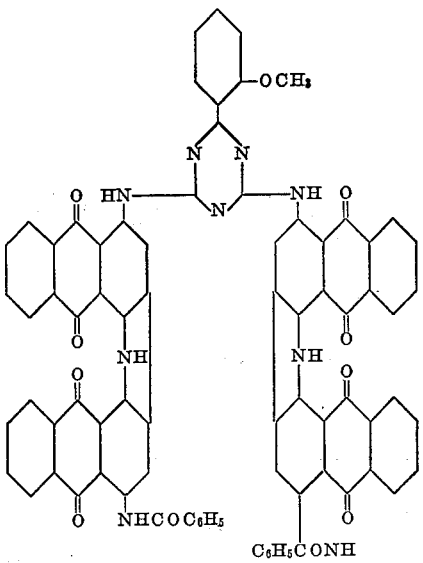

The dyestuff is a black powder which may be acid pasted from concentrated sulfuric acid. It gives olive dyeings on cotton of good fastness properties, from a yellow-brown vat.

num chloride. The product dyes cotton a fast orange-brown shade from a red-brown vat and gives a bluish-red solution in sulfuric acid.

Example 4

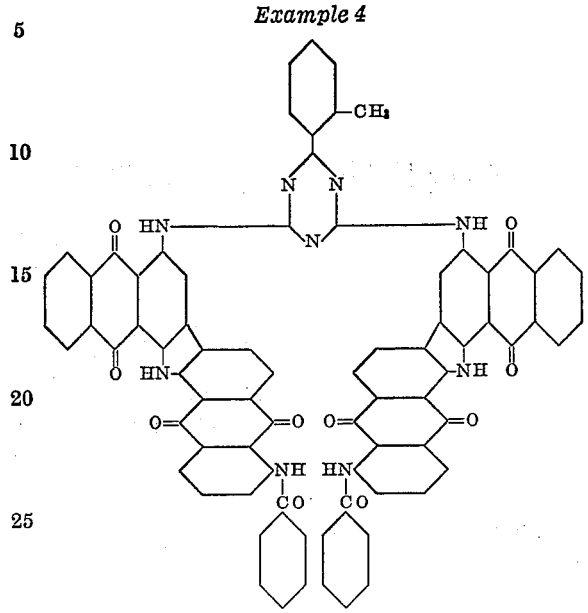

Example 3

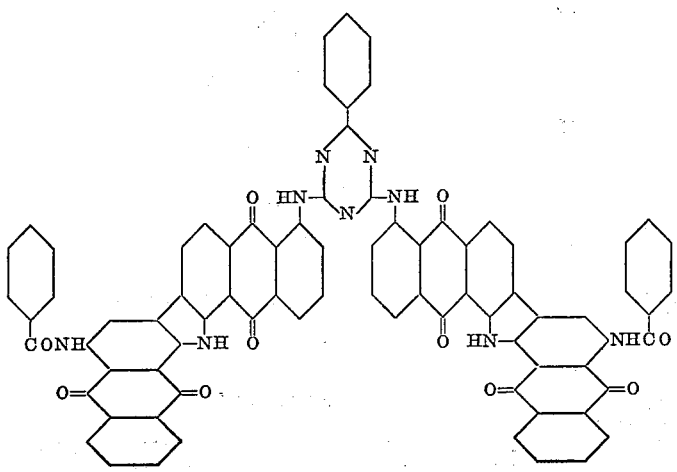

Twenty parts of 2-phenyl-4,6-di(5-chloro-1-anthraquinonylamino)-1,3,5-triazine (prepared from 2-phenyl-4,6-dichloro-1,3,5-triazine and 1-amino-5-chloroanthraquinone), 21 parts of 1-amino-4-benzoylaminoanthraquinone, 1.5 parts of cupric acetate, 0.5 part copper powder, 15 parts of sodium carbonate, and 500 parts of nitrobenzene are stirred together at 195–200° C. until the reaction is substantially complete. The mixture is cooled to 50° C. and the precipitated product filtered and washed with nitrobenzene and alcohol. The inorganic impurities are removed by digestion in hot dilute hydrochloric acid followed by filtration and washing. The product is a brown powder, giving a green solution in sulfuric acid and dyeing cotton a fast violet brown shade from a brown vat.

Ring closure to the carbazole can be effected at 100° C. in nitrobenzene in the presence of alumi- A mixture of 6.8 parts of 2-(o-methylphenyl)-4,6 - di(4-chloro-1-anthraquinonylamino)-1,3,5-triazine (prepared from 2-o-methylphenyl-4,6-dichloro-1,3,5-triazine and 1-amino-4-chloroanthraquinone), 6.9 parts of 1-amino-5-benzoylaminoanthraquinone, 0.4 part cupric acetate, 0.1 part copper powder, 5 parts sodium carbonate and 100 parts of nitrobenzene are stirred at 200° C. until the reaction is substantially complete. The product is then isolated in a manner similar to Example 3. It is a brown powder which gives a brown color in sulfuric acid (changing to olive on standing) and dyes cotton black-brown shades from a brown vat.

The ring closure to the carbazole is effected at 85–90° C. in nitrobenzene with aluminum chloride. The product dyes cotton yellow-brown shades from an orange vat and gives a gray-blue solution in sulfuric acid.

Example 5

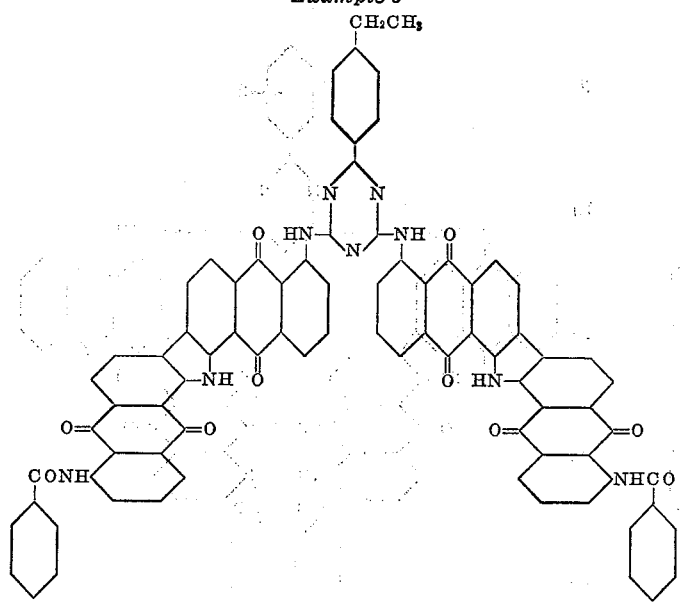

Fourteen parts of 2-(p-ethylphenyl)-4,6-di(5-chloro - 1 - anthraquinonylamino)-1,3,5-triazine (prepared from 2-(p-ethylphenyl)-4,6-dichloro-1,3,5-triazine and 1-amino-5-chloroanthraquinone), 13.8 parts of 1-amino-5-benzoylaminoanthraquinone, 10 parts of sodium carbonate, 0.6 part of cupric acetate, 0.2 part of copper powder, and 200 parts of nitrobenzene are stirred at 200° C. until the reaction is substantially complete. The product is isolated as in Example 3. It is a dark red powder, giving an orange sulfuric acid solution, and dyeing cotton strong bordeaux red shades from a brown vat.

It can be cyclized to the carbazole by treatment with aluminum chloride in nitrobenzene at 85–90° C. The final product gives strong orange shades on cotton from an orange vat and gives a blue sulfuric acid solution.

Fourteen parts of 2-(p-ethylphenyl)-4,6-di(5-chloro - 1 - anthraquinonylamino)-1,3,5-triazine (prepared from 2-(p-ethylphenyl)-4,6-dichloro-1,3,5 - triazine and 1 - amino - 5 - chloroanthraquinone), 12.6 parts of 1 - amino - 5 - (4-chlorobenzoylamino)-anthraquinone, 10 parts of sodium carbonate, 0.6 part of cupric acetate, 0.2 part of copper powder, and 200 parts of nitrobenzene are stirred at 200° C. until the reaction is substantially complete. The product is isolated as in Example 3. It may be cyclized to the carbazole by treatment with aluminum chloride in nitrobenzene at 85–90° C.

"α,α'-Dianthrimide carbazole" appearing in the claims is used in the usual sense and connotes the following ring system:

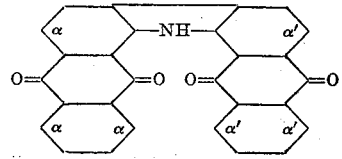

Example 6

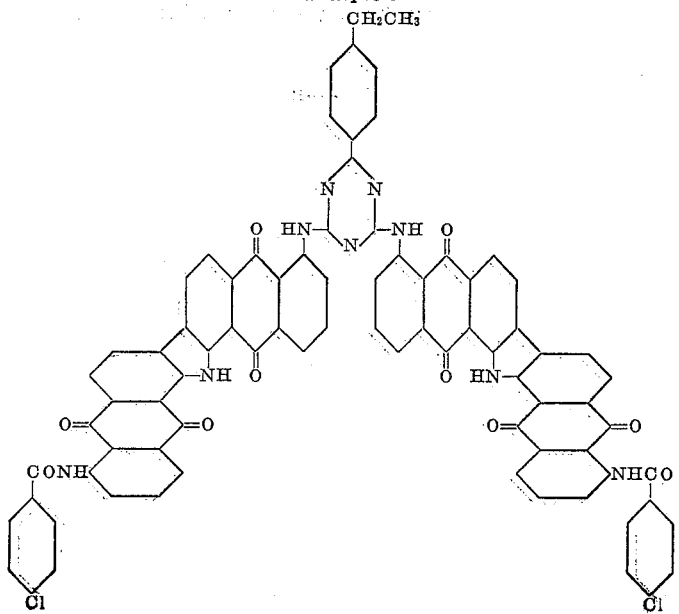

We claim:
1. Vat dyes having the formula:

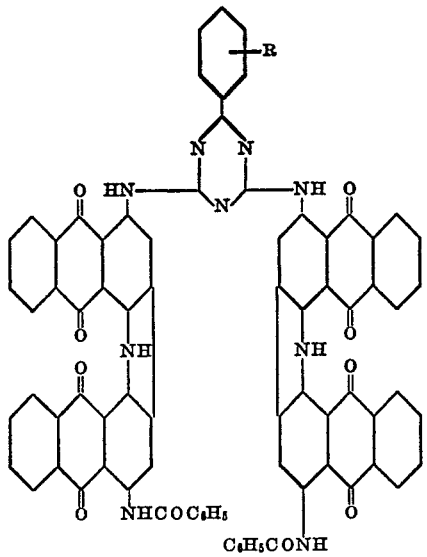

in which R is selected from the group consisting of hydrogen, lower alkyl and lower alkoxy radicals.

2. Vat dyes having the formula:

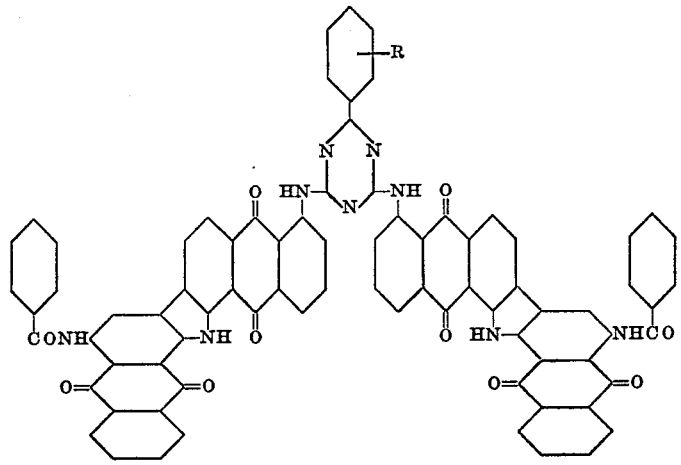

in which R is selected from the group consisting of hydrogen, lower alkyl and lower alkoxy radicals.

3. Vat dyes having the formula:

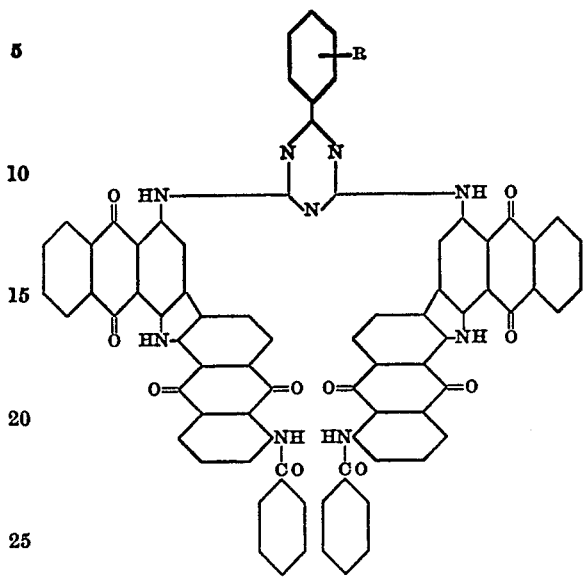

in which R is selected from the group consisting of hydrogen, lower alkyl and lower alkoxy radicals.

4. Vat dyes having the formula:

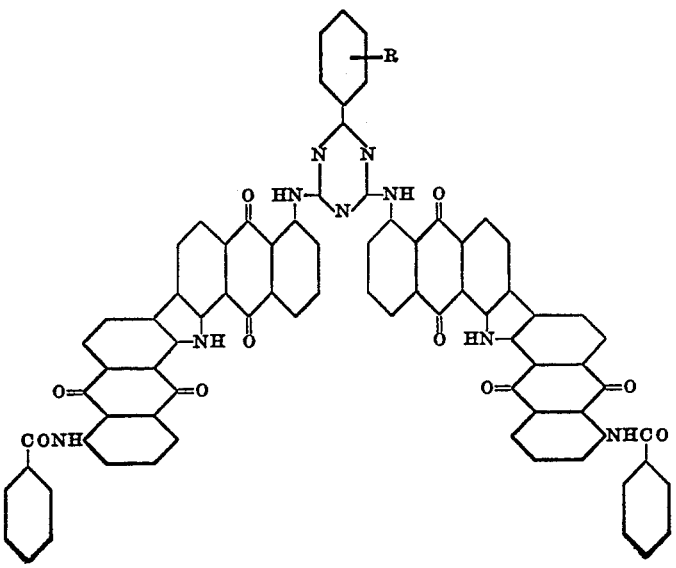

in which R is selected from the group consisting of hydrogen, lower alkyl and lower alkoxy radicals.
5. A vat dye having the formula:
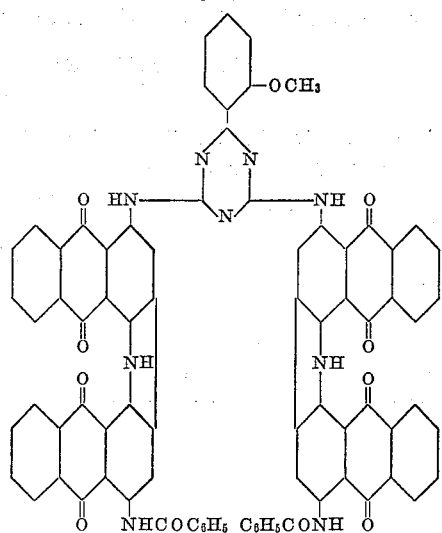
6. A vat dye having the formula:
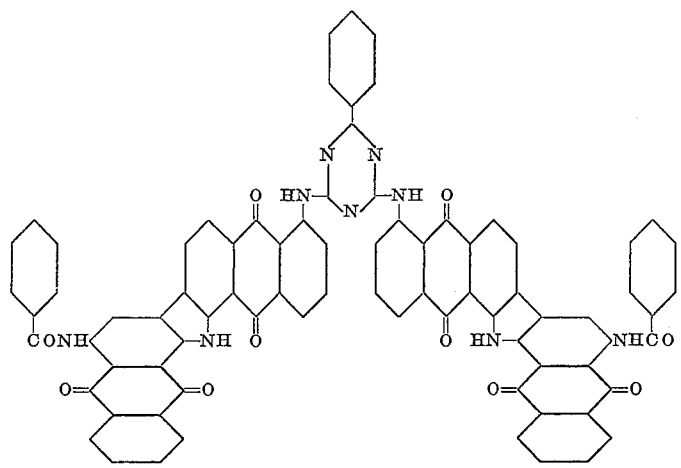
7. A vat dye having the formula:
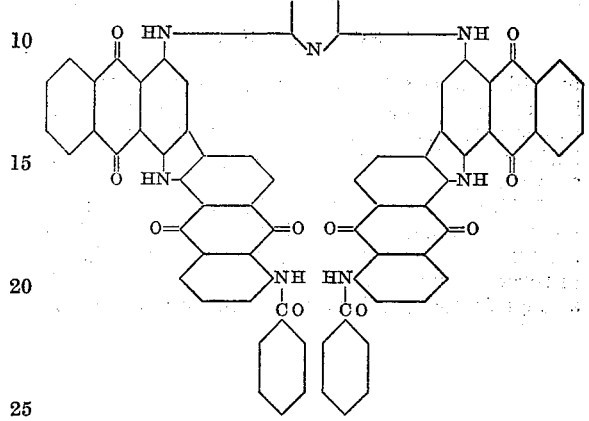
8. A vat dye having the formula:
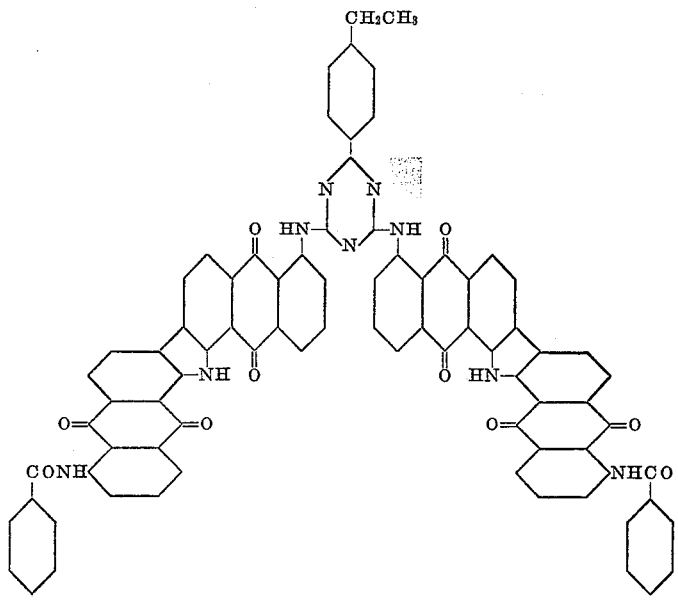

9. Vat dyes having the formula:

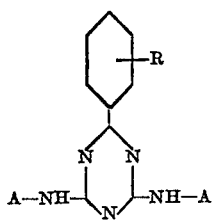

in which R is selected from the group consisting of hydrogen, lower alkyl and lower alkoxy radicals and A is an α'-benzoylamino-α,α'-dianthrimide carbazole bonded to the —NH— group at an α position.

10. The process of preparing vat dyes, which comprises reacting a 2-phenyl-4,6-dihalo-1,3,5-triazine with two mols of an α-amino-α-halo-anthraquinone, heating in an inert solvent with a cupriferous catalyst the resulting 2-phenyl-4,6-di-(α-halo-anthraquinonylamino)-triazine with two mols of α-amino-α-benzoylaminoanthraquinone, and heating the resulting dianthrimide in the presence of an aluminum chloride to effect the formation of dianthrimide carbazole rings.

MARIO SCALERA.
ASA WILLARD JOYCE.

References Cited in the file of this patent

UNITED STATES PATENTS

| Number | Name | Date |
|---|---|---|
| 1,437,783 | Steinbuch | Dec. 5, 1922 |
| 1,888,631 | Kunz | Nov. 22, 1932 |
| 1,944,602 | Weiners | Mar. 19, 1935 |

FOREIGN PATENTS

| Number | Country | Date |
|---|---|---|
| 449,477 | Great Britain | 1936 |
| 796,539 | France | 1935 |